United States Patent [19]
Mesnel et al.

[11] Patent Number: 5,226,258
[45] Date of Patent: Jul. 13, 1993

[54] WATERTIGHT SECTION EQUIPPED WITH AN ORNAMENT FOR THE FRAME OF A MOVABLE WINDOW OF A VEHICLE

[75] Inventors: Francois Mesnel, Neuilly-sur-Seine; Gerard Mesnel, Carrieres-sur-Seine, both of France

[73] Assignee: Etablissements Mesnel S.A., Carrieres-sur-Seine, France

[21] Appl. No.: 884,409

[22] Filed: May 18, 1992

[51] Int. Cl.⁵ .................................. E06B 7/16
[52] U.S. Cl. .......................... 49/490.1; 49/440
[58] Field of Search ............... 49/490, 441, 440, 490.1

[56] References Cited
U.S. PATENT DOCUMENTS

| | | | |
|---|---|---|---|
| 4,656,784 | 4/1987 | Brachmann | 49/441 X |
| 4,800,681 | 1/1989 | Skillen et al. | 49/441 X |
| 5,010,689 | 4/1991 | Vaughan | 49/440 |
| 5,033,246 | 7/1991 | Vaughan et al. | 49/490 X |
| 5,095,656 | 3/1992 | Keys | 49/441 |

FOREIGN PATENT DOCUMENTS 2623596 5/1989 France.
2638780 5/1990 France.

*Primary Examiner*—Philip C. Kannan
*Attorney, Agent, or Firm*—Cumpston & Shaw

[57] ABSTRACT

Watertight section for the frame of a movable window of a vehicle, namely an automobile, formed from a resilient material (6) in which is embedded a metal frame (5) includes two adjoining inverted U-shaped parts, one (1) known as a clip, intended to cap a protruding rim (3) of the window frame, while the second U-shaped part (4) known as a runner, is intended to guide and receive the peripheral portion of the movable window in its closed position. The frame (5) of the U-shaped arm of the runner that is intended to be placed facing the exterior of the vehicle juts out laterally from the resilient material and curves toward the outside of this arm, while at the base of this same arm, the resilient material forms a boss (9) below the base of the U, so that a C-shaped ornament (8) can be fastened at right angles onto the section by means of a clip on the above mentioned boss (9) and on the curved protruding part (11) of the frame.

8 Claims, 1 Drawing Sheet

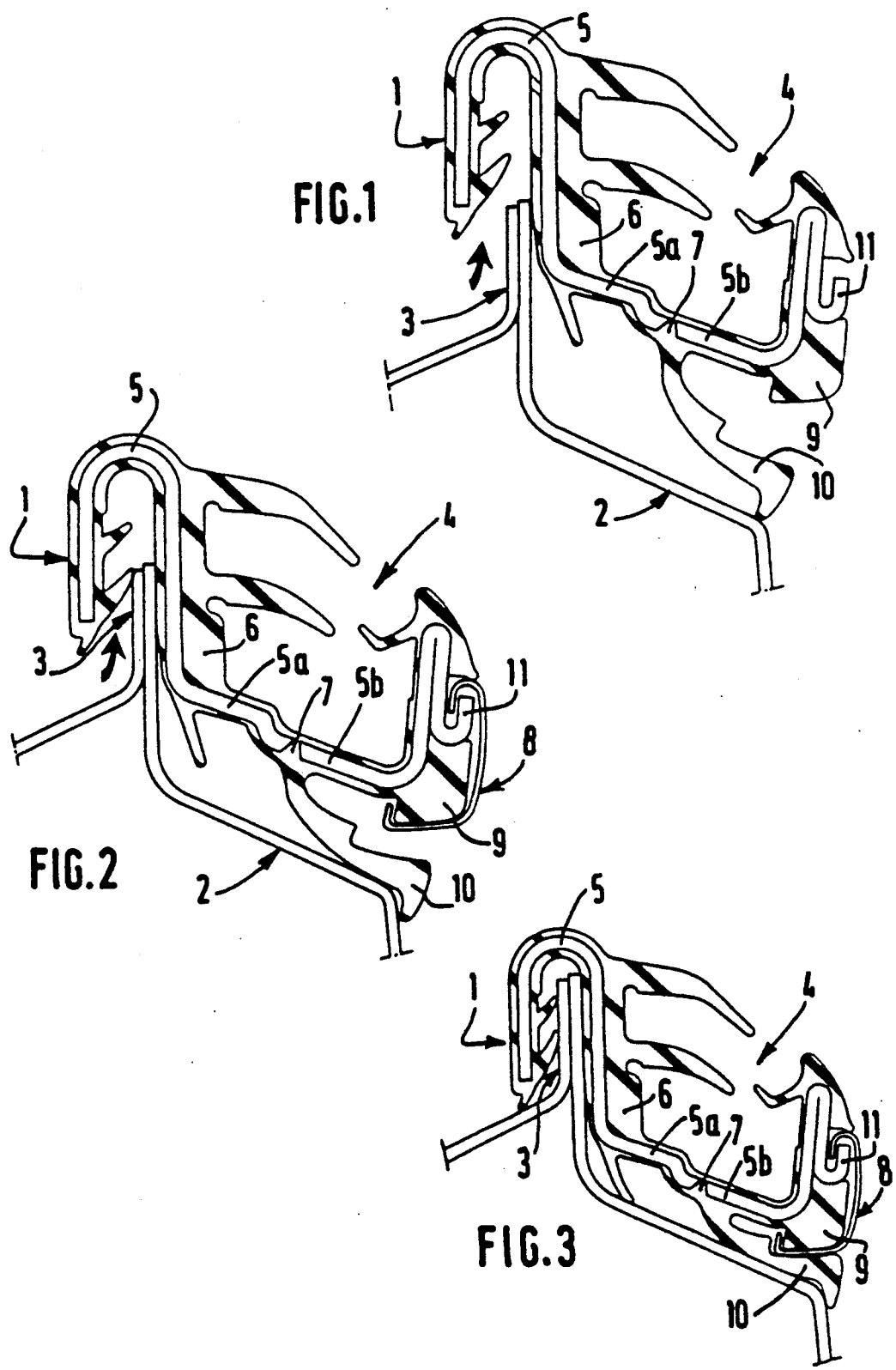

WATERTIGHT SECTION EQUIPPED WITH AN ORNAMENT FOR THE FRAME OF A MOVABLE WINDOW OF A VEHICLE

The present invention concerns a watertight section equipped with an ornament, for the frame of a movable window of a vehicle, namely an automobile.

We know that it is necessary to guarantee the watertightness of the peripheries of the sliding windows of automobile doors and that, with this aim in view, we generally use a section made of a resilient material, fitted with a metal frame, which includes two U-shaped segments. One of these U-shaped segments, or clip, is intended to cap and grip a protruding rim of the window frame, in order to fasten the section firmly, while the second U-shaped segment, or runner, is intended to guide the window in its sliding movement and to receive it in its closed position. Such sections are described, for example, in the French patent No. 2 623 596 and certificate of addition No. 2 638 780.

The portion of the runner turned facing the exterior of the vehicle is frequently equipped with an auxiliary component designed to hide it from view and adorn it. This adornment, in metal or plastic, follows the contour of the runner and is generally riveted on the protruding rim of the door frame, the section being placed in position on this protruding rim only after attaching the ornament.

These mounting operations are however time-consuming and costly and the invention aims to eliminate them by proposing a section for the frame of a movable window which can itself be equipped with an ornament, without fastening it to the body of the vehicle.

Another aim of the invention is to provide such a section for the frame of a movable window, in which the ornament with which it is fitted is bolted into position with the section itself, at the time of its mounting on the window frame.

The invention has as its final purpose to offer such a section equipped with an ornament which can be set in place at a reduced cost compared with the former method of installing ornaments.

To that end, the purpose of the invention is to provide a waterproof section for the frame of a movable window of a vehicle, namely an automobile. This section is formed from a resilient material in which a metal frame is embedded including two adjoining inverted U-shaped parts. One, known as a clip, is intended to cap a protruding rim of the window frame. The second U-shaped part, known as a runner, is intended to guide and receive the peripheral portion of the movable window in its closed position. The section is characterized in that the frame of the U-shaped arm of the runner is designed to be placed facing the exterior of the vehicle, jutting out laterally from the resilient material and curving toward the outside of this arm, while at the base of this same arm, the resilient material forms a boss below the base of the U so that a C-shaped ornament can be fastened at right angles by means of a clip on the above-mentioned boss and on the curved protruding part of the frame.

As a further advantage, a soft edge in a resilient material will jut out from the base of the runner toward the boss, so as to face toward the exterior of the vehicle and be fastened between the boss and the window frame after mounting the section on it, thus ensuring the bolting of the ornament in position on the section.

The section which has just been defined, equipped with a C-shaped ornament, fastened on the curved protruding part of the frame and on the aforementioned boss, constitutes another objective of the present invention.

A preferred embodiment of the invention is described below in more detail, with reference to the appended drawings.

FIGS. 1, 2 and 3 are cross sections of the section according to the invention illustrating three successive phases of its mounting on a frame of a movable window of an automobile.

The section represented in the diagrams includes a U-shaped part, forming a clip, intended to be fastened firmly to frame 2 for a movable window of an automobile door, by capping a protruding part or rabbet 3 of this frame. This part 1 is joined to a second U-shaped part, or runner 4, serving as a means of guiding and waterproofing the movable window.

The U-shaped segments of parts 1 and 4 are inverted in relation to each other.

As described in the French certificate of addition No. 2 623 596 mentioned above, clip 1 and runner 4 include metal frame 5 covered with elastomer 6. Frame 5 is split in the part corresponding to the base of the U of the runner to form two strands 5a and 5b jointed at the level of their separation by elastomer hinge 7, which allows strand 5b to pivot together with strand 5a and to move strand 5a when the window comes to rest at the end of its movement (position when the window is closed) against the bottom of runner 5.

According to the invention, metal frame 5 protrudes laterally outside of elastomer 6 which covers the side of runner 4 facing the exterior of the vehicle and its lateral rim 11 is curved so as to permit the attachment of ornament 8 to the C-shaped section. Moreover ornament 8 caps boss 9 of elastomer 6, placed under the base of runner 6, here approximately at the end of the side of this runner outside of which frame 5 juts out into 11.

Soft elastomer edge 10 protrudes below the base of runner 4 toward the exterior of the vehicle, so as to be able to be clipped between the base of the runner and door frame 2, when the section is mounted on the latter (FIG. 3).

The installation of the section on the window frame is carried out in three steps. In the first step, illustrated by FIG. 1, the section rests on door frame 2 and clip 1 and simply comes to rest on rabbet 3. In this position, it is then possible to fasten ornament 8 on the side of runner 4 facing the exterior of the vehicle, as shown in FIG. 2. In the third step, clip 5 is fitted on rabbet 3 so as to be firmly fastened to it and to fit runner 4 securely against the door frame, while folding back edge 10 against the base of the runner (FIG. 3). In this position, edge 10 rests against the part of ornament 8 which caps boss 9. This part is thus held firmly between boss 9 and edge 10 and the ornament is then bolted into position on the section.

Consequently the invention provides a simple and easy means of installing this ornament on the exterior part of such a frame, since it is not necessary to attach the ornament on the door frame by mechanical means.

We claim;

1. Waterproof section for the window frame of a movable window of a vehicle, comprising a resilient material; a metal frame embedded in the resilient material including a U-shaped clip, for mounting on a protruding rim of the window frame and a U-shaped runner, adjoining the clip and inverted with respect thereto, the runner adapted to guide and receive a peripheral portion of the movable window in its closed position, a branch of the metal frame of the U-shaped runner opposite the clip including a curved protruding part protruding laterally outside the resilient material; and a boss formed in the resilient material below the base of the U in this same branch so as to be able to fasten at right angles to the section a C-shaped ornament by means of a clip on the boss and on the curved protruding part of the frame.

2. Section according to claim 1, comprising a soft lip of the resilient material extending out from the base of the runner in the direction of the boss so as to face toward the exterior of the vehicle and be clipped between the boss and the window frame, after mounting the section on it.

3. Waterproof section for the window frame of a movable window of a vehicle, comprising a resilient material, a metal frame embedded in the resilient material including a U-shaped clip, for mounting on a protruding rim of the window frame and a U-shaped runner, adjoining the clip and inverted with respect thereto, the runner adapted to guide and receive a peripheral portion of the movable window in its closed position, a branch of the metal frame of the U-shaped runner opposite the clip including a curved protruding part protruding laterally outside the resilient material; while at the base of this same branch, the resilient material forms a boss below the base of the U; and an ornament having a clip engaging the boss and the curved protruding part adjacent to the exterior of the vehicle.

4. Section according to claim 3 comprising a soft lip of the resilient material extending out from the base of the runner in the direction of the boss so as to face toward the exterior of the vehicle and be clipped between the boss and the window frame.

5. A waterproof section for the frame of a movable window of a vehicle comprising:
   a body of resilient material;
   a metal frame embedded in the body and including two adjoining inverted U-shaped frame members, the first one of said members comprising a clip and adapted to cap a protruding rim of the window frame, the second U-shaped frame member comprising a runner adapted to guide and receive the peripheral portion of the movable window in its closed position, a branch of the frame portion of the U-shaped runner adapted to be installed facing toward the exterior of the vehicle and protruding laterally outside the resilient material and curving toward the exterior of the U-shaped, respectively.
   the resilient material at the base of this U-shaped, respectively forming a boss below the base of the U-shaped runner and adapted to receive a C-shaped ornament attached by a clip on the boss and on the curved protruding part of the frame at right angles to the section.

6. A section according to claim 5 in which the body comprises a soft lip extending outwardly from the base of the runner in the direction of the boss so as to face toward the exterior of the vehicle and adapted to be clipped between the boss and the window frame after mounting the section on the window frame.

7. A waterproof section for the frame of a movable window of a vehicle comprising:
   a body of resilient material;
   a metal frame embedded in the body and including two adjoining inverted U-shaped frame members, the first one of said members comprising a clip and adapted to cap a protruding rim of the window frame, the second U-shaped frame member comprising a runner adapted to guide and receive the peripheral portion of the movable window in its closed position, a branch of the frame portion of the U-shaped runner adapted to be installed facing toward the exterior of the vehicle and protruding laterally outside the resilient material and curving toward the exterior of the U-shaped, respectively.
   the resilient material at the base of this U-shaped, respectively forming a boss below the base of the U-shaped runner; and
   an ornament clipped on the boss and on part of the frame protruding beyond the side of the runner adjacent to the exterior of the vehicle.

8. A section according to claim 7, further comprising a soft lip of the resilient material extending out from the base of the runner in the direction of the boss so as to face toward the exterior of the vehicle and be clipped between the boss and the window frame.

* * * * *